March 18, 1941.  C. D. HAVEN ET AL  2,235,680
MULTIPLE GLASS SHEET GLAZING UNIT AND METHOD OF MAKING THE SAME
Filed July 14, 1937  3 Sheets-Sheet 1
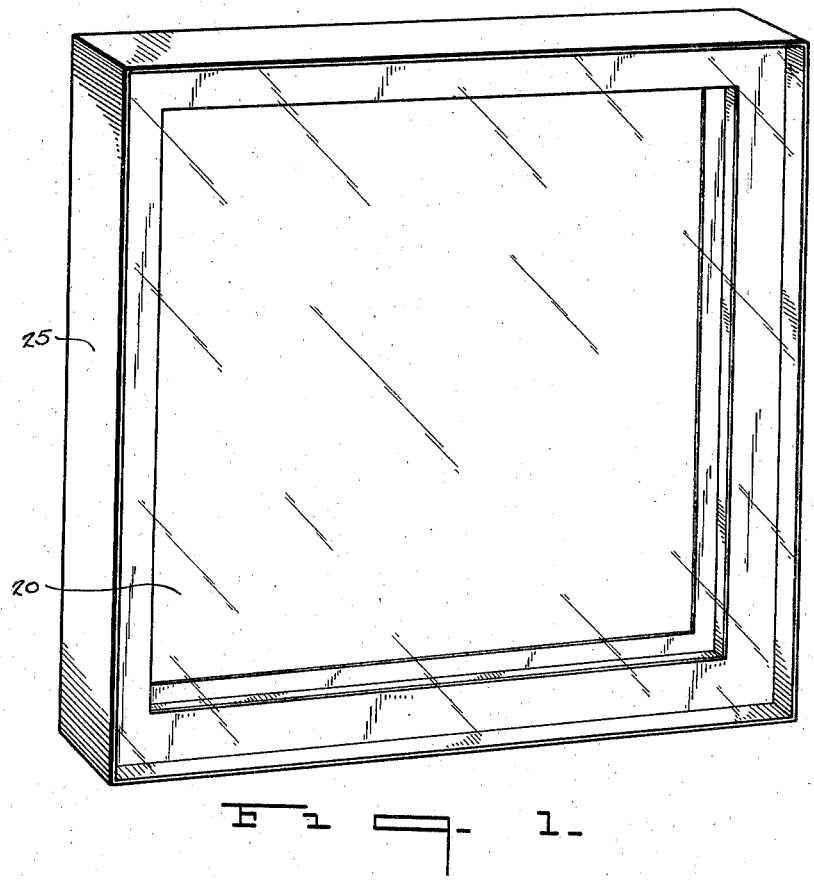
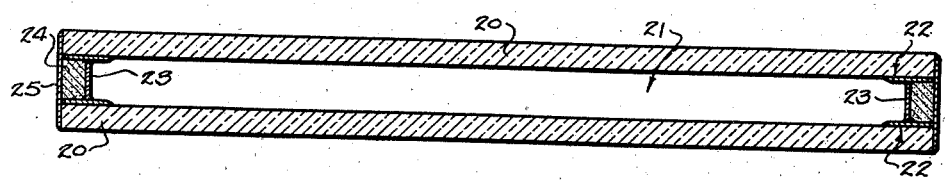
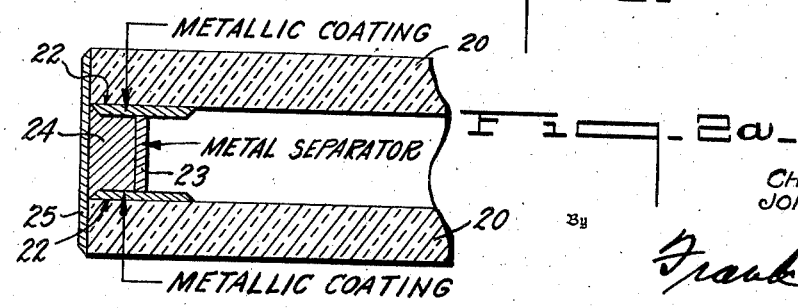
Inventors
CHARLES D. HAVEN.
JOHN J. HOPFIELD.
Frank Fraser
Attorney

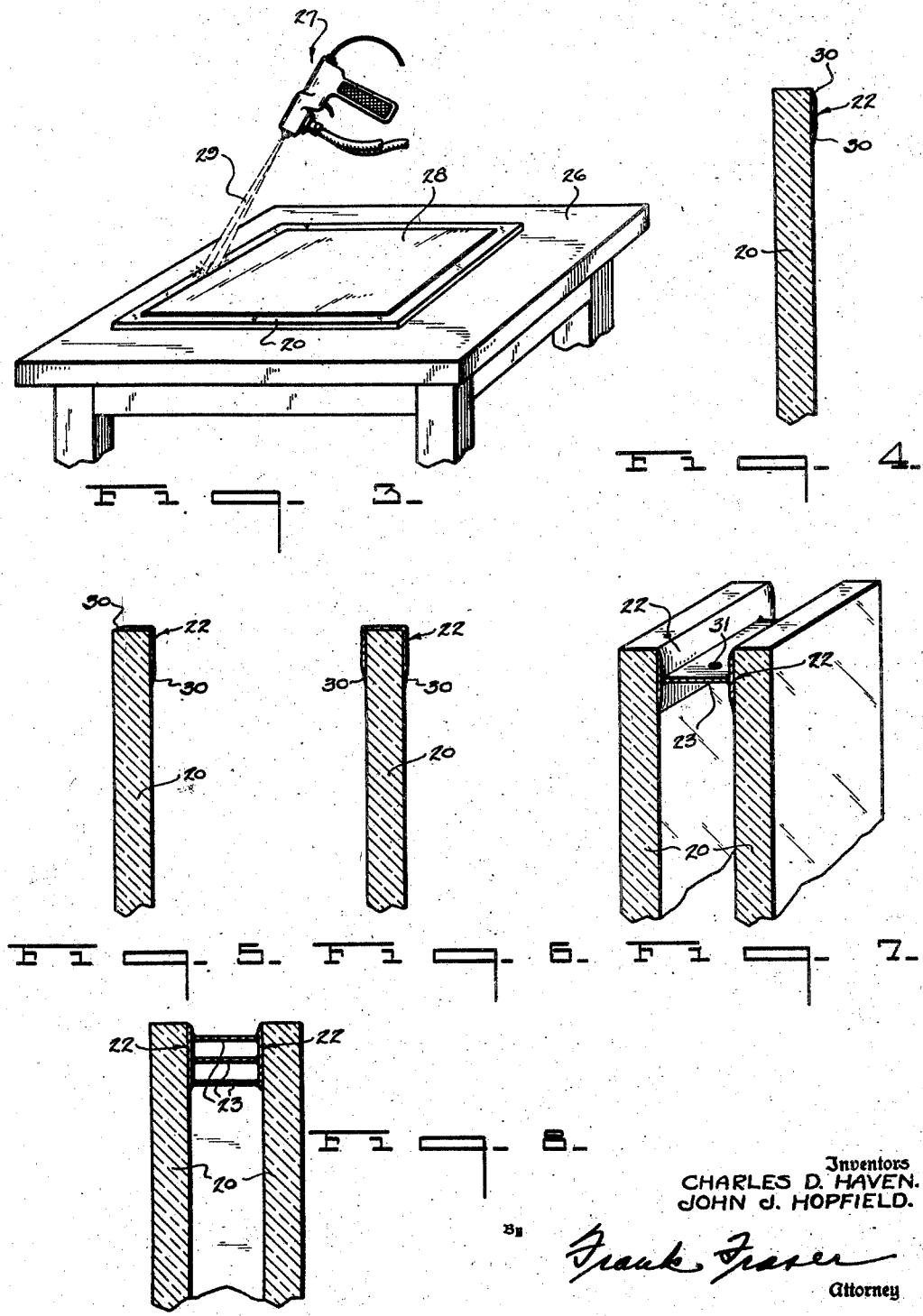

March 18, 1941.    C. D. HAVEN ET AL    2,235,680
MULTIPLE GLASS SHEET GLAZING UNIT AND METHOD OF MAKING THE SAME
Filed July 14, 1937    3 Sheets-Sheet 3
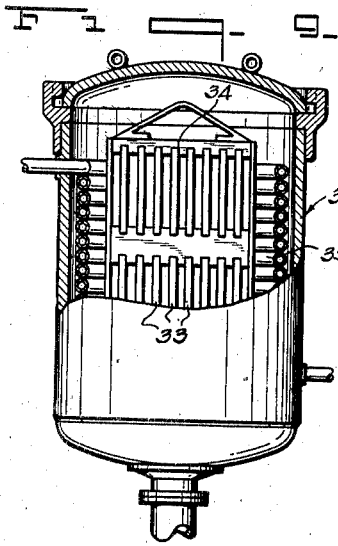
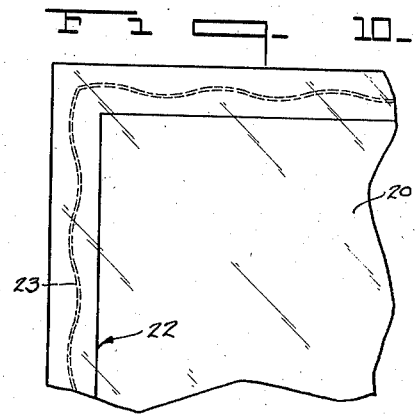
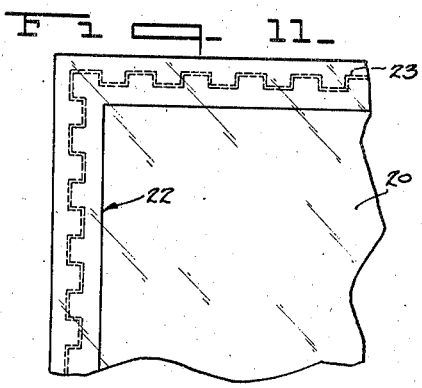
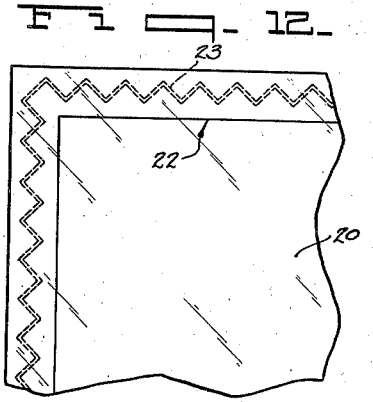
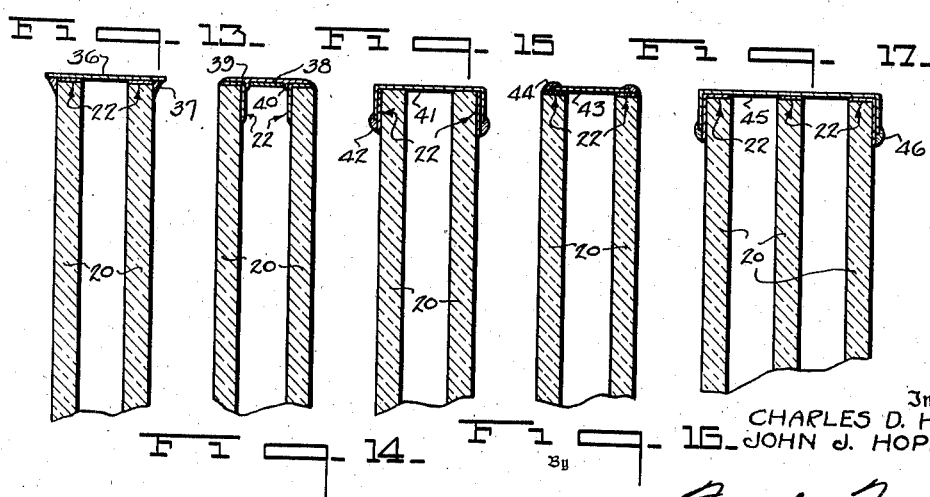
Inventors
CHARLES D. HAVEN.
JOHN J. HOPFIELD.
By Frank Fraser
Attorney Patented Mar. 18, 1941

2,235,680

UNITED STATES PATENT OFFICE 2,235,680

MULTIPLE GLASS SHEET GLAZING UNIT AND METHOD OF MAKING THE SAME

Charles D. Haven and John J. Hopfield, Toledo, Ohio, assignors to Libbey-Owens-Ford Glass Company, Toledo, Ohio, a corporation of Ohio Application July 14, 1937, Serial No. 153,458

14 Claims. (Cl. 20—56.5)

The present invention relates to an improved multiple glass sheet glazing unit and to the method of making the same.

The general type of glazing unit with which this invention is concerned consists preferably, though not necessarily, of two sheets of glass spaced from one another and hermetically sealed around the edges thereof to form a dead air space therebetween which may be filled with dehydrated air, nitrogen, or other gas or exhausted to provide a partial vacuum.

The use of double glazed windows has long been desirable wherever it is important to reduce heat transfer and to prevent condensation of moisture upon glass in glazed openings. Thus, it has the effect of greatly retarding the escape of heat therethrough from the inside of a building during the winter as well as minimizing the passage of heat into the building from the outside during the summer. This is due to the fact that the airtight space between the glass sheets, whether filled with air or exhausted to provide a partial vacuum, is an exceedingly poor conductor of heat so that a double glazed window possesses much greater insulating properties than a single sheet or plate of glass.

The successful use of this type of glazing unit is dependent largely upon the maintaining of the space between the two sheets of glass hermetically sealed since should this seal be broken, permitting air to enter and circulate between the sheets, the efficiency and insulating effect of the unit would be materially reduced. When using such a glazing unit, the sheet of glass positioned to the inside of the glazed opening is ordinarily subjected to a different temperature than that to which the outer sheet is exposed, so that in such cases one sheet of glass will expand or contract to a greater or lesser extent than the other sheet, with the result that a decided strain is placed upon the edge sealing means.

The glass sheets of a double glazing unit are also subjected to strains from changes of internal pressure due to changes of the temperature of the air within the space between the glass sheets and also from changes in the pressure of the outside atmosphere. The strains set up by these varying pressure conditions co-act with the expansion or contraction of the two sheets of glass in a tendency to break down the seal between the glass sheets.

The breaking down of the seal around the edges of the glass sheets will not only materially lessen the insulating effect of the glazing unit but, in addition, moisture and other foreign matter will be permitted to seep in between the sheets and to set up or promote a staining or clouding of the inner surfaces of the glass. Further, the surfaces may become otherwise soiled, and as it is impossible to reach them for cleaning purposes, the clarity and transparency of the glass is ruined. Internal condensation likewise takes place between the glass sheets which is of course highly objectionable.

Heretofore, it has been customary to maintain the glass sheets in properly spaced relation by the use of separator strips positioned between and bonded to the said sheets around the perimeters thereof by means of a suitable adhesive or cement applied to the strips and/or glass. It has been proposed to make use of separator strips of felt, rubber, cork, wood, etc. However, separator strips of this character have not proven entirely satisfactory due to the diffusion of moisture and other atmospheric elements that are responsible for accelerated weathering. That is to say, there is a tendency for moisture to seep through the separator strips and to be diffused as water vapor upon the inner surfaces of the glass sheets. Further, when using rubber separator strips, the sulphur or sulphur compounds from the rubber tend to distill out and collect on the glass surfaces, producing an objectionable appearance.

Aside from the above, there is a decided tendency for the differential in expansion and contraction of the two sheets of glass, coupled with the other varying conditions to which the glass is normally subjected, to break down the bond between the glass and separator strips and to otherwise adversely effect the structure resulting in failure thereof.

An important object of the invention is the provision of a multiple glass sheet glazing unit of improved construction which avoids those objectional features referred to above and in which diffusion of moisture and other atmospheric elements upon the inner surfaces of the glass sheets will be reduced to a minimum, if not entirely eliminated, thereby lessening the liability of weathering and in consequence increasing the life of the glazing unit.

Another important object of the invention is the provision of a multiple glass sheet glazing unit embodying novel separator means for hermetically sealing the space between the glass sheets and which is of such character that it will not be adversely affected by a differential in contraction and expansion of the glass sheets or a pressure difference between the air space and the outside air.

Another important object of the invention is the provision of a multiple glass sheet glazing unit wherein the use of separator strips of an organic material is eliminated and in which a metal spacer strip is substituted therefor, which is bonded to the glass sheets by heat and pressure in such a manner as to permanently hermetically seal the marginal portions of the unit.

Still another important object of the invention is the provision of a multiple glass sheet glazing unit of relatively simple, inexpensive construction wherein the glass sheets are first provided with fused metallic coatings to which the metal spacer strips are then soldered, whereby an effective and durable seal is provided which will prevent any access of moisture between the glass sheets.

A still further important object of the invention is the provision of a novel method for producing a multiple glass sheet glazing unit of the above character and possessing those features and advantages herein set forth.

Other objects and advantages of the invention will become more apparent during the course of the following description, when taken in connection with the accompanying drawings.

In the drawings, wherein like numerals are employed to designate like parts throughout the same, Fig. 1 is a perspective view of a compelte multiple glass sheet glazing unit made according to the invention, Fig. 2 is a transverse sectional view thereof, Fig. 2a is e an enlarged transverse sectional view of one edge of the unit, Fig. 3 is a perspective view showing the application of the metallic coating to the marginal portions of one of the glass sheets, Figs. 4, 5 and 6 are sectional views showing three different types of metallic coatings which may be used, Fig. 7 is a perspective sectional view showing the metal spacer strip secured to the metallic coatings, Fig. 8 is a sectional view of an alternate arrangement in which a plurality of metal spacer strips are used to give added strength and rigidity to the unit, Fig. 9 is an elevation, partially broken away, of a vacuum chamber in which a plurality of units are adapted to be simultaneously dehydrated, Figs. 10, 11 and 12 illustrate different types of metal spacer strips which may be employed in the fabrication of the unit, and Figs. 13, 14, 15, 16 and 17 are sectional views of a number of alternate unit constructions, all of which embody the basic principles of the invention.

With reference to the drawings, there is illustrated in Figs. 1 and 2 a complete multiple glass sheet glazing unit constructed in accordance with the invention and including two sheets of glass 20—20 arranged face to face but slightly spaced from one another to provide an air space 21 therebetween. The inner faces of the glass sheets 20—20 are provided around the marginal portions thereof with fused metallic coatings 22—22 while disposed between and firmly secured to said metallic coatings is a metal spacer strip 23 which serves not only to hermetically seal the space 21 but which further serves to maintain the glass sheets in predetermined spaced relation.

While the metal spacer strips 23, properly bonded to the glass sheets, may and in some case will be sufficient to effectively seal the edges of the unit against the access of moisture yet, as an added protection, the metal spacer strips can be arranged inwardly of the peripheral edges of the glass sheets as shown to provide a channel extending entirely around the unit and which can be filled with any suitable filler 24 such as a thermoplastic sealing material. The outer peripheral edges of the glass sheets, as well as the filling material 24 can be covered by a coating 25 of varnish, shellac, tinfoil or the like.

In making the double glazing unit illustrated in Figs. 1 and 2, the metallic coatings 22—22 are first formed upon the two sheets of glass 20—20 and these coatings may be confined entirely upon the inner faces of the glass sheets as shown in Fig. 4 or they may also extend over the peripheral edges of the sheets as in Fig. 5 or be applied not only to the peripheral edges of the sheets but also to both the inner and outer faces thereof as in Fig. 6 depending upon which type of coating is found to most satisfactorily meet the conditions to which the unit will be subjected when put to actual use.

The metallic coatings 22—22 are preferably of composite formation consisting of one or more coats of aluminum followed by one or more coats of copper, tin, lead or any other suitable metal capable of taking solder. In applying the base aluminum coat to the glass sheet, the said sheet is first preferably heated and then laid horizontally upon a flat table or other support 26 (Fig. 3) and while in such position, and also while heated, molten aluminum is sprayed upon the marginal portions of the sheet and also upon the peripheral edges thereof if desired, this being accomplished by the use of a conventional metal spray gun 27.

In order to assist in the formation of a metallic coating of the desired width, the body of the glass sheet can be covered by a suitable mask 28 of such size as to leave exposed the marginal portions only of the sheet. The molten aluminum indicated at 29 (Fig. 3) impinging upon the heated glass sheet apparently results in a chemical combination with the surface skin of the sheet and thus becomes incorporated in the glass body so that all danger of the coating becoming loose or peeling off when subjected to moisture, oil, etc., or upon expansion and contraction of the glass is obviated. That is to say, the aluminum is caused to become a permanent part of the glass and provide a proper foundation for the bonding of the metal spacer strip thereto.

As pointed out above, the glass sheet is preferably heated prior to the application of the molten aluminum thereto and by way of example, the glass may be brought up to the temperature of melting lead (327.4° C.), when the metal is sprayed thereon. This temperature is desirable since it is well below the annealing point of glass, so that if tempered glass is used it will lose none of its strain while ordinary glass will acquire no permanent strain in the process. This heating up of the glass can be accomplished in any desired manner and also if desired the molten metal can be applied to the glass in a hot enclosure.

After one or the desired number of coats of aluminum have been applied, they are followed by one or more coats of copper, tin, lead, or any other metal capable of taking solder, and these additional coats can be also applied by the hot metal spray method or if preferred by electroplating, soldering iron or by any other suitable means. It is, of course, possible to eliminate the use of aluminum and apply the copper, tin, lead, etc., directly to the glass sheets, but these metals are not as satisfactory for the base coat as aluminum since they do not bond as well to the glass.

It is preferred that the metal coats be applied to the glass in such a manner that the completed metallic coating 22 tapers to a feather edge, as indicated at 30 in Figs. 4, 5 and 6. This arrangement has been found to be much more satisfactory than when the edges of the coating are square or abrupt. The tapering off of the thickness of the metallic coatings at the edges thereof serves to prevent or minimize the possibility of the glass fracturing adjacent to the metallic coatings upon relative expansion and contraction of the glass and metal. This tapering of the metallic coatings can be effected in any suitable manner such as by directing the blast of metal at a proper angle with relation to the mask 28 as indicated in Fig. 3; by filing or scraping the margins of the metallic coatings to produce this tapered or feather edge; or by suitable shape and disposition of the masks with reference to the metalized edge and direction of metallic blast.

After a metallic coating of the desired thickness has been built up on the glass sheets, the said coatings are adapted to be tinned or, in other words, provided with a coating of solder. The tinning of the metallic coatings may be effected by first applying thereto a suitable soldering flux and then flowing a layer of solder upon said coating with the aid of a heated iron or by other suitable means such as a spray gun with or without a flux. It will, of course, be readily appreciated that other methods of tinning the metallic coatings may be employed and that the invention is not limited to the particular method referred to above.

After the tinning of the metallic coatings has been completed, the two sheets of glass 20—20 are disposed in properly spaced relation and the metal spacer strip 23 associated therewith, said strip being of any suitable metal capable of taking solder although it is preferred to use a metal of ductility such as copper, lead, etc. Prior to the positioning of the metal spacer strip between the glass sheet, the edges of said strip are also tinned as above described. After the glass sheets and metal spacer strip have been arranged in properly assembled relationship, the said spacer strip can be fused to the metallic coatings by the application of heat and pressure to the assembly. This can be accomplished in a number of different ways such as by means of a solder iron or flame; by placing the assembly between a pair of hot plates, or in a suitable furnace. It will, of course, be appreciated that the glass sheets and especially the inner surfaces thereof should be thoroughly cleaned before being assembled with the metal spacer strip.

As shown in Fig. 7, only a single metal spacer strip 23 is provided, but if desired, a plurality of such strips may be used as shown in Fig. 8, to increase the strength and rigidity of the unit. Furthermore, the spacer strips may be straight as shown in Figs. 1 and 2 or they may be corrugated or angularly bent to any degree or shape as for example in Figs. 10, 11 and 12.

It is preferred in the fabrication of the glazing unit that a low melting point solder be used, since excessive heat applied too long to the metallic coatings will result in an alloy action tending to dissolve the coatings from the glass sheets. For example, a solder having a melting point of approximately 320° F. and below is preferred, since it results in a slow alloy action which does not injure the metallic coatings unless the heat application is abnormally applied. One type of low melting point solder which may be satisfactorily used consists of one-third lead, one-third tin, one-third bismuth. The melting point can be varied with a variation in the amount of lead, tin or bismuth.

In constructing the unit, one or more holes 31 (Fig. 7) may be provided in the metal spacer strip 23 for the purpose of dehydrating the air space 21 after which the hole can be closed with a small drop of solder. One method which may be followed in the dehydrating treatment consists in the use of an autoclave or vacuum chamber 32 (Fig. 9) in which a plurality of units indicated at 33 can be simultaneously treated by placing them in a rack 34. After the units have been placed in the autoclave, the said autoclave is closed and a vacuum set up therein, whereby the units can be completely evacuated. Dehydrated air, nitrogen or other gas can then be introduced into the autoclave to again fill the spaces 21 of the units. This can be accomplished in a few minutes and without strain on the units. The chamber can then be opened up and the vent holes 31 in the spacer strips plugged with solder.

If desired, the autoclave can also be provided with a suitable heating device 35, such as electric or steam coils for heating the glass in vacuum for better conditioning of the inner surfaces of the units, and this heating device could be changed in the case of steam or hot water to a cooling coil so that when the units are sealed up at atmospheric pressure and then allowed to come to room temperature, any pressure from slightly greater than atmospheric to slightly less than atmospheric could be sealed in the units.

Although not always necessary, it is desirable as an added precaution that the channel formed around the edges of the unit be filled with the thermoplastic sealing material 24 referred to above, or other suitable filler, which can in turn be covered with the layer 25 of varnish, shellac, or the like. The use of the filling material 24 is preferred in order that no voids will be left in the putty construction when the unit is glazed in the sash. This material will also serve as an additional means to seal minute, undetectable perforations in the construction should they occur and thus serve to render the entire unit both air and moisture tight. The coating 25 of varnish or shellac will protect the filling material from the action of the putty used in glazing the unit, and prevent the solvents in the putty and filling material from mixing with one another.

In Figs. 13 to 17 inclusive are illustrated five alternate arrangements all embodying the principles of the invention. For instance, in Fig. 13, the outer peripheral edges only of the glass sheets 20—20 are provided with the metallic coatings 22—22 as above described and a metal spacer strip 36 is fused thereto. The spacer strip 36, which is arranged entirely outwardly of the edges of the glass sheets, extends beyond the outer surfaces of said sheets as shown and is further secured to each sheet by a fillet 37 preferably of solder.

In Fig. 14, the metallic coatings 22—22 are applied not only to the peripheral edges of the glass sheets 20—20 but also to the marginal portions of the inner faces thereof. Arranged between the glass sheets, but slightly spaced therefrom, are the metal spacer strips 38 and covering these strips and also the peripheral edges of the glass sheets is a layer of solder 39, which is also disposed between the edges of the spacer strips and the metallic coatings as indicated at 40 to secure them together.

In Fig. 15 the metallic coatings 22—22 are provided on the outer faces only of the glass sheets 20—20 and the metal spacer strip 41 is of substantially U-shape so that it overlaps the metallic coatings and is secured thereto. A solder fillet 42 may also be provided at the edges of the spacer strips to more firmly secure them to the glass sheets.

The construction shown in Fig. 16 is substantially the same as that shown in Fig. 13 except that the metal spacer strip 43 terminates inwardly of the outer faces of the glass sheets and is secured at its edges by solder 44. The form illustrated in Fig. 17 is substantially the same as that shown in Fig. 15 with the exception that it includes three sheets of glass 20 instead of two and the peripheral edges of the central sheet of the glass are also provided with a metallic coating, to which the metal spacer strip 45 is secured. The metal spacer strip is also secured to the peripheral edges and outer faces of the two outer sheets of glass and can be additionally secured thereto by solder 46.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. A multiple glass sheet glazing unit of the character described, comprising two spaced parallel sheets of glass, metallic coatings arranged around the marginal portions of the opposed surfaces of said glass sheets and firmly adherent thereto, and a metal spacer strip arranged between the glass sheets and secured to the metallic coatings, said spacer strip being positioned inwardly of the peripheral edges of said sheets and approximately centrally of said metallic coatings.

2. A multiple glass sheet glazing unit of the character described, comprising two spaced parallel sheets of glass, metallic coatings arranged around the marginal portions of the opposed surfaces of said glass sheets and firmly adherent thereto, a metal spacer strip arranged between the glass sheets and secured to the metallic coatings, said spacer strip being positioned inwardly of the peripheral edges of said sheets and approximately centrally of said metallic coatings to form a channel around the edges of the unit, and a material filling said channel.

3. A multiple glass sheet glazing unit of the character described, comprising two spaced parallel sheets of glass, metallic coatings arranged around the marginal portions of the opposed surfaces of said glass sheets and firmly adherent thereto, said coatings including a base coat of aluminum and a second coat on the base coat of a metal capable of taking solder, and a metal spacer strip arranged between the glass sheets and soldered to the metallic coatings, said spacer strip being positioned inwardly of the peripheral edges of the glass sheets and approximately centrally of said metallic coatings.

4. A multiple glass sheet glazing unit of the character described, comprising two spaced parallel sheets of glass, metallic coatings arranged around the marginal portions of the opposed surfaces of said glass sheets and firmly adherent thereto, said coatings including a base coat of aluminum and a second coat on the base coat of a metal capable of taking solder, a metal spacer strip arranged between the glass sheets and soldered to the metallic coatings, said spacer strip being positioned inwardly of the peripheral edges of the glass sheets and approximately centrally of said metallic coatings to form a channel around the edges of the unit, and a material filling said channel.

5. A multiple glass sheet glazing unit of the character described, comprising two spaced parallel sheets of glass, metallic coatings arranged around the marginal portions of the opposed surfaces of said glass sheets and firmly adherent thereto, said coatings having tapered edges, a metal spacer strip arranged between the glass sheets and secured to the metallic coatings, said spacer strip being positioned inwardly of the peripheral edges of the glass sheets and approximately centrally of said metallic coatings to form a channel around the edges of the unit, thermoplastic sealing material filling said channel, and a protective coating for said sealing material.

6. A multiple glass sheet glazing unit of the character described, comprising two spaced parallel sheets of glass, metallic coatings arranged around the marginal portions of the opposed surfaces of said glass sheets and firmly adherent thereto, said coatings including a base coat of aluminum and a second coat on the base coat of a metal capable of taking solder, said metallic coatings having tapered edges, a metal spacer strip arranged between the glass sheets and soldered to the metallic coatings, said spacer strip being positioned inwardly of the peripheral edges of the glass sheets and approximately centrally of said metallic coatings to form a channel around the edges of the unit, a thermoplastic sealing material filling said channel, and a protective coating for said sealing material.

7. The method of fabricating a multiple glass sheet glazing unit, which comprises first applying a metallic coating around the marginal portions of two sheets of glass by spraying molten metal thereon, arranging said sheets in spaced parallel relation with the metallic coatings thereon facing one another, positioning a metal spacer strip between the sheets inwardly of the edges thereof and approximately centrally of said metallic coatings, and in then soldering the metal spacer strip directly to the metallic coatings.

8. The method of fabricating a multiple glass sheet glazing unit, which comprises first heating a plurality of glass sheets, then applying a metallic coating around the marginal portions of two sheets of glass by spraying molten metal thereon while the sheets are heated, positioning a metal spacer strip between the glass sheets inwardly of the edges thereof and approximately centrally of said metallic coatings, and in then soldering the metal spacer strip directly to the metallic coatings.

9. The method of fabricating a multiple glass sheet glazing unit, which comprises first heating a plurality of sheets of glass, applying a metallic coating around the marginal portions of two sheets of glass by spraying a base coat of molten aluminum upon the heated sheets after which a second coat of a metal capable of taking solder is applied to the base coat, arranging said sheets in predetermined spaced relation with the metallic coatings facing one another, positioning a metal spacer strip between the glass sheets inwardly of the edges thereof and approximately centrally of the metallic coatings, and in soldering the spacer strip to the metallic coatings.

10. The method of fabricating a multiple glass sheet glazing unit, which comprises first heating a plurality of sheets of glass, applying a metallic coating around the marginal portions of two sheets of glass by spraying a base coat of molten aluminum upon the heated sheets after which a second coat of a metal capable of taking solder is applied to the base coat, arranging said sheets in predetermined spaced relation with the metallic coatings facing one another, positioning a metal spacer strip between the glass sheets inwardly of the peripheral edges of said sheets and approximately centrally of the metallic coatings to form a channel; soldering the spacer strip to the metallic coatings, and in filling said channel with a sealing material.

11. A multiple glass sheet glazing unit of the character described, comprising a plurality of parallel spaced glass sheets, and a substantially H-shaped metal separator lying between the marginal portions of adjacent sheets of glass and firmly adherent thereto, said H-shaped separator comprising a web of ductile metal soldered to metallic coatings on the glass sheets.

12. A multiple glass sheet glazing unit of the character described, comprising a plurality of parallel spaced glass sheets, and a substantially H-shaped metal separator lying between the marginal portions of adjacent sheets of glass and firmly adherent thereto, said H-shaped separator comprising a web of ductile metal soldered to metallic coatings on the glass sheets, the edges of said metallic coatings being tapered.

13. A multiple glass sheet glazing unit of the character described, comprising two spaced parallel sheets of glass, metallic coatings arranged around the marginal portions of the opposed surfaces of said glass sheets and firmly adherent thereto, and a metal spacer strip arranged between the glass sheets and secured to the metallic coatings, said spacer strip being positioned inwardly of the peripheral edges of said sheets and also inwardly of the edges of said metallic coatings.

14. The methol of fabricating a multiple glass sheet glazing unit, which comprises first applying a metallic coating around the marginal portions of two sheets of glass, arranging the glass sheets in spaced parallel relation with the metallic coatings thereon facing one another, positioning a metal spacer strip between the glass sheets inwardly of the edges thereof and also inwardly of the edges of said metallic coatings, and in then soldering the metal spacer strip to the said metallic coatings.

CHARLES D. HAVEN.
JOHN J. HOPFIELD.